March 29, 1966   LE GRAND G. VAN UITERT   3,243,723
OPTICAL MASER USING SINGLE CRYSTAL MOLYBDATE COMPOSITION
Filed Nov. 20, 1961
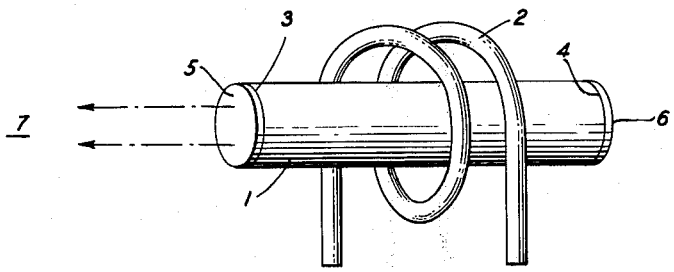
INVENTOR
*L. G. VAN UITERT*
BY
ATTORNEY

United States Patent Office

3,243,723
Patented Mar. 29, 1966

3,243,723
OPTICAL MASER USING SINGLE CRYSTAL
MOLYBDATE COMPOSITION
Le Grand G. Van Uitert, Morris Township, Morris County, N.J., assignor to Bell Telephone Laboratories, Incorporated, New York, N.Y., a corporation of New York
Filed Nov. 20, 1961, Ser. No. 153,501
12 Claims. (Cl. 331—94.5)

This invention relates to optical masers utilizing single crystal molybdates as the active maser material.

Recently, considerable interest has developed in a new class of solid state maser devices in which the stimulated frequency is in the visible or near visible spectrum including the infrared and ultraviolet portions of the electromagnetic spectrum. This spectrum, here referred to as "light spectrum," encompasses the wavelength range of from 100 A to $2 \times 10^6$ A. In principle, these devices are directly analogous to the microwave maser, and the mechanics of their operation are well detailed in the art, for example as described by A. L. Schawlow and C. H. Townes in United States Patent 2,929,922, issued Mar. 22, 1960.

Among the more promising forms of optical masers are those which employ a material whose energy level system is characterized by at least three energy levels, with the separation of these levels falling within the desired operating frequency ranges. During operation, there is established at least intermittently a nonequilibrium electron population distribution in a pair of the selected three energy levels. In particular, the population of the higher of the selected pairs of energy levels is increased to the point at which it is greater than that of the lower level. It is customary to refer to a material in such a state of non-equilibrium as exhibiting a negative temperature.

It is characteristic that if there is applied to a material in a negative temperature state a signal of the frequency which satisfies Planck's law with respect to the two energy levels in nonequilibrium, the applied signal will stimulate emission of radiation in phase with the applied signal from the material, so resulting in amplification. In other words, the active maser material is chosen such that the two energy levels are separated by an energy equal to $h\mu$, where $h$ is Planck's constant and $\mu$ is equal to the frequency to be amplified. This separation is less than the separation between the top and bottom levels of the selected three-level energy system.

The negative temperature state is established by applying to the material pump energy of a frequency of at least the frequency corresponding to the separation between the top and bottom levels of the selected three-level energy system. The application of sufficient pump energy effects electron transitions from the bottom level to the top level, and the populations of the bottom and top levels are thereby made to approach equality. Under these conditions, there is a negative temperature between the top and middle levels or between the middle and bottom levels. Pump energy is generally applied to the material during at least a portion of the period of signal amplification.

Among the more promising active maser materials are those which comprise a host crystal containing paramagnetic ions from which the stimulated emission occurs. To be of value, the host crystal must accept the paramagnetic ions in such fashion that they are able on excitation to fluoresce with good overall quantum efficiency with as much of the emitted energy as possible concentrated in a single narrow line. To date, the number of materials meeting this requirement is limited. One material successfully operated in an optical maser is ruby. Ruby, however, suffers the disadvantage of requiring high pumping power to establish a negative temperature state. The amount of power supplied to ruby has thus far limited ruby maser operation to producing a pulsed beam of coherent light.

Furthermore, since the choice of maser material determines the frequency of the emission lines, it is desirable that new materials fulfilling the above-detailed requirements be developed so as to make possible the amplification of coherent light beams over the wide range of the light spectrum.

In accordance with the invention, it has been discovered that certain divalent metal ion-containing molybdate compositions of matter provide an enhanced latice environment for fluorescent paramagnetic ions. More particularly, the molybdate host lattices of the invention comprise the divalent metal ion molybdates selected from the group consisting of calcium molybdate, strontium molybdate, lead molybdate, and barium molybdate. As further discussed herein, these lattices may also include monovalent alkali ions which compensate for the charge of the paramagnetic ions substituted for the divalent ions. Such ions are sodium, lithium, potassium, rubidium and cesium. These molybdates are single crystal compositions of matter having a noncubic crystalline lattice of the Scheelite structure. Paramagnetic ions exhibiting particularly enhanced characteristics in such lattices include the trivalent rare earth ions praseodymium, neodymium, samarium, europium, terbium, holmium, erbium, thulium, and ytterbium.

The ability of the molybdate lattices to enhance the emission intensity of fluorescent paramagnetic ions is attributable to the fact that such lattices are capable of absorbing pump energy and transmitting the absorbed energy to the ions more efficiently than other comparable prior art materials. This increased efficiency is associated with the more favorable absorption edge of the molybdate lattice which lies in the long wave ultraviolet region, approximately 3400 A. Calcium tungstate, in contrast, has a short wave ultraviolet absorption edge of approximately 2500 A.

It has been found that the emission intensity of materials of the invention tends to increase as the bond strength between the fluorescing ions and the molybdate lattice is weakened. For example, as the radii of the divalent metal ion in the molybdate lattice are increased, the emission intensity of terbium ions substituted in part for the divalent ions is also increased. The effect of the increased interatomic distance between the terbium ions and the molybdate lattice, with an accompanying decrease in bonding strength, is illustrated by the fact that terbium ions in a strontium molybdate lattice are twice as bright as the same ions in a calcium molybdate. Terbium ions in lead molybdate are ten times brighter than the same ions in the calcium molybdate.

In contrast, the comparable calcium tungstate compositions exhibit a decrease in brightness as the bonding strength between the fluorescent ions and the lattice is weakened. As a result of this difference in bonding strength on emission intensity, the previously discussed terbium-containing strontium molybdates are approximately one and one-half times brighter than the comparable tungstates, and the terbium-containing lead molybdates are fourteen times brighter than the comparable tungstates.

A further advantage accruing to the molybdate host lattices is the narrow line width associated with the emitted energy. Neodymium-containing calcium molybdate crystals emit radiation at 77° K. having a wavelength of approximately 1.06 microns. The line width associated with this wavelength is approximately 2 cm.$^{-1}$. The line width associated with the same wavelength for comparable neodymium calcium tungstate crystals is in the order of 6 cm.$^{-1}$.

In view of the preceding discussion, it is seen that the molybdate lattices of the invention are possessed of characteristics necessary for producing a continuous coherent light beam by maser action.

The invention may be more easily understood by reference to the drawing, in which the figure is a perspective view of an apparatus utilizing the composition of the invention.

Referring more particularly to the figure, there is shown a rod-shaped crystal 1 having the composition as disclosed herein. Pump energy is supplied by means of a helical lamp 2 encompassing rod 1 and connected to an energy source not shown. Lamp 2 is advantageously of a type which produces intense radiation over a broad band extending from about 0.3 micron to 2 microns in the infrared. Xenon lamps, for example, are considered useful to pump the material of the invention. Ends 3 and 4 of rod 1 are ground and polished so as to be optically flat and parallel and are silvered so as to provide reflective layers 5 and 6. As indicated, layer 6 is completely reflecting while layer 5 is only partially reflecting, so permitting the escape of coherent radiation 7. Rod 1 during operation is typically maintained in an atmosphere of liquid nitrogen or liquid oxygen so as to more readily attain a negative temperature state.

Optical masers of the general type illustrated in the figure have been operated using as the active maser material the molybdate compositions of the invention. Illustrative examples of such maser operation are given below.

*Example 1*

An optical maser was operated using as the active medium calcium molybdate containing about 0.5 atomic percent neodymium in place of calcium. The device produced intense coherent emission with a xenon pump having a wavelength of about 1.0673 microns at room temperature and 1.0670 microns at 77° K.

*Example 2*

An optical maser was operated using as the active medium lead molybdate containing about 0.5 atomic percent neodymium in place of lead. The device produced intense coherent radiation with a xenon pump having a wavelength of about 1.0586 microns at room temperature.

*Example 3*

An optical maser was operated using as the active medium strontium molybdate containing about 0.2 atomic percent neodymium in place of strontium. The device produced intense coherent emission with a xenon pump having a wavelength of about 1.0643 microns at room temperature and 1.0640 microns at liquid nitrogen temperature.

It is noted that device discussion has been largely in terms of the most commonly reported maser design. Although such a design is easily fabricated, other configurations have been disclosed in the literature and may prove advantageous. All such variations are considered within the scope of the invention.

As understood by the art, although in principle there is no lower limit on the concentration of rare earth ions utilized, a practical limit of about 0.01 atom percent rare earth ion in place of the divalent metal ion of the host lattice is imposed by the necessity of having sufficient unpaired electrons available in the negative temperature state to adequately amplify the output signal. The optimum compositions for minimum threshold in general are of the order of from 1 to 2 percent for the materials of this invention. For terbium, europium, and ytterbium, brightness continues to increase with increasing concentration substantially above this level to a maximum of about 25 percent, however with accompanying line broadening. Such increased concentrations are useful despite an increase in threshold in producing emission of substantially increased band width.

The molybdate compositions of the invention are conveniently made by a method generally described as the Czochralski method. This method is described in an article by J. Czochralski in Zeitschrift fur Physikalische Chemie, volume 92, pages 219–221 (1918). A recent description of the process is found in an article by K. Nassau and L. G. Van Uitert in Journal of Applied Physics, volume 31, page 1508 (1960). In accordance with this method, a melt is formed of a mixture of initial components, the composition of the melt being the desired composition of the grown crystal. A seed crystal is inserted into the top surface of the melt and simultaneously rotated and slowly withdrawn from the melt. Charge compensation occurs in the lattice by the substitution of two trivalent ions for three divalent ions.

A variety of molybdate compositions of the invention have been grown by the Czochralski melt technique. One particular material was grown by melting 122.7 grams PbO, 79.85 grams MoO$_3$, and 0.46 grams Nd$_2$O$_3$ in an iridium crucible. A seed crystal was inserted into the top surface of the melt and was simultaneously rotated and drawn from the melt. The speed of rotation was about 30 r.p.m. and the rate of drawing was about one-fifth inch per hour. The resulting lead molybdate crystal contained about 0.3 percent neodymium in place of lead.

The molybdate compositions are also susceptible of growth by other conventional methods known to the art. Such methods include crystal growth by means of the flux method disclosed in United States Patent 3,003,142, issued Nov. 3, 1961. In accordance with this method, a flux of an alkali metal molybdate and the chosen divalent ion molybdate is utilized to promote crystal growth. By this process, the monovalent alkali metal ions are typically incorporated into the lattice of the crystal. Charge compensation occurs in the lattice by the substitution of a monovalent and a trivalent ion for two divalent ions.

All compositions discussed herein have been grown by the flux technique. One particular material was grown by dry mixing 150 grams BaO, 719.75 grams MoO$_3$, 212.6 grams Na$_2$CO$_3$, and 1.65 grams Pr$_2$O$_3$. The mixture was heated in a platinum crucible in air for four hours at a temperature of approximately 1200° C. The molten solution so formed was then cooled in air at a controlled rate of five degrees per hour to a temperature of 700° C. The resultant solids were then furnace cooled to room temperature and washed with hot water. The resulting barium molybdate crystals contained about one percent praseodymium and one percent sodium in place of barium.

The same processing steps detailed above were utilized to make the other compositions of the invention by the flux method with the exception that a melt temperature of 1100° C. was used for the lead molybdate compositions.

The particular method used to make the compositions of the invention is within the knowledge of the art. It has been found that crystals formed by the flux method are generally smaller but brighter than crystals formed by the Czochralski melt method. It is believed that the incorporation of alkali metal ions into the molybdate lattice, by increasing perfection in the lattice, causes this enhancement in emission intensity. The addition of alkali metal ions to the Czochralski melt therefore appears advantageous. It has been further found that lead molybdate crystals formed from a lithium molybdate flux exhibit particularly intense emission.

Although the invention has been described with reference to specific embodiments, these embodiments are to be construed as illustrative only, and not as limiting in any way the scope and spirit of the invention.

What is claimed is:

1. An optical maser utilizing as the active maser material a single crystal molybdate composition comprising a divalent metal ion molybdate selected from the group consisting of calcium molybdate, strontium molybdate, lead molybdate, and barium molybdate in which from about 0.01% to 25% of the divalent metal ions have been replaced by trivalent fluorescent ions, and pumping means for establishing a negative temperature state.

2. An optical maser device in accordance with claim 1 wherein said fluorescent ion is praseodymium.

3. An optical maser device in accordance with claim 1 wherein said fluorescent ion is samarium.

4. An optical maser device in accordance with claim 1 wherein said fluorescent ion is europium.

5. An optical maser device in accordance with claim 1 wherein said fluorescent ion is terbium.

6. An optical maser device in accordance with claim 1 wherein said fluorescent ion is holmium.

7. An optical maser device in accordance with claim 1 wherein said fluorescent ion is erbium.

8. An optical maser device in accordance with claim 1 wherein said fluorescent ion is thulium.

9. An optical maser device in accordance with claim 1 wherein said fluorescent ion is ytterbium.

10. An optical maser device utilizing as the active maser material a single crystal divalent metal ion molybdate host lattice selected from the group consisting of calcium molybdate, strontium molybdate, lead molybdate, and barium molybdate in which from about 0.01% to 25% of said divalent ions have been replaced by trivalent fluorescent ions and 0% to about 25% of said divalent ions have been replaced by a monovalent alkali metal ion, and pumping means for establishing a negative temperature state.

11. An optical maser device in accordance with claim 10 wherein said divalent metal ion molybdate lattice is lead molybdate.

12. An optical maser device in accordance with claim 11 wherein said alkali metal ion is lithium.

References Cited by the Examiner

UNITED STATES PATENTS 2,929,922    3/1960    Schawlow et al. _____ 330—4

OTHER REFERENCES

Kroger: "Some Aspects of the Luminescence of Solids," Elsevier Publishing Company, Inc., New York 1948, pages 107–110, 121, and 144–149.

ROY LAKE, *Primary Examiner.*

D. R. HOSTETTER, *Assistant Examiner.*